April 8, 1941.   N. F. REA   2,237,447
WEED GUN
Filed Dec. 4, 1939
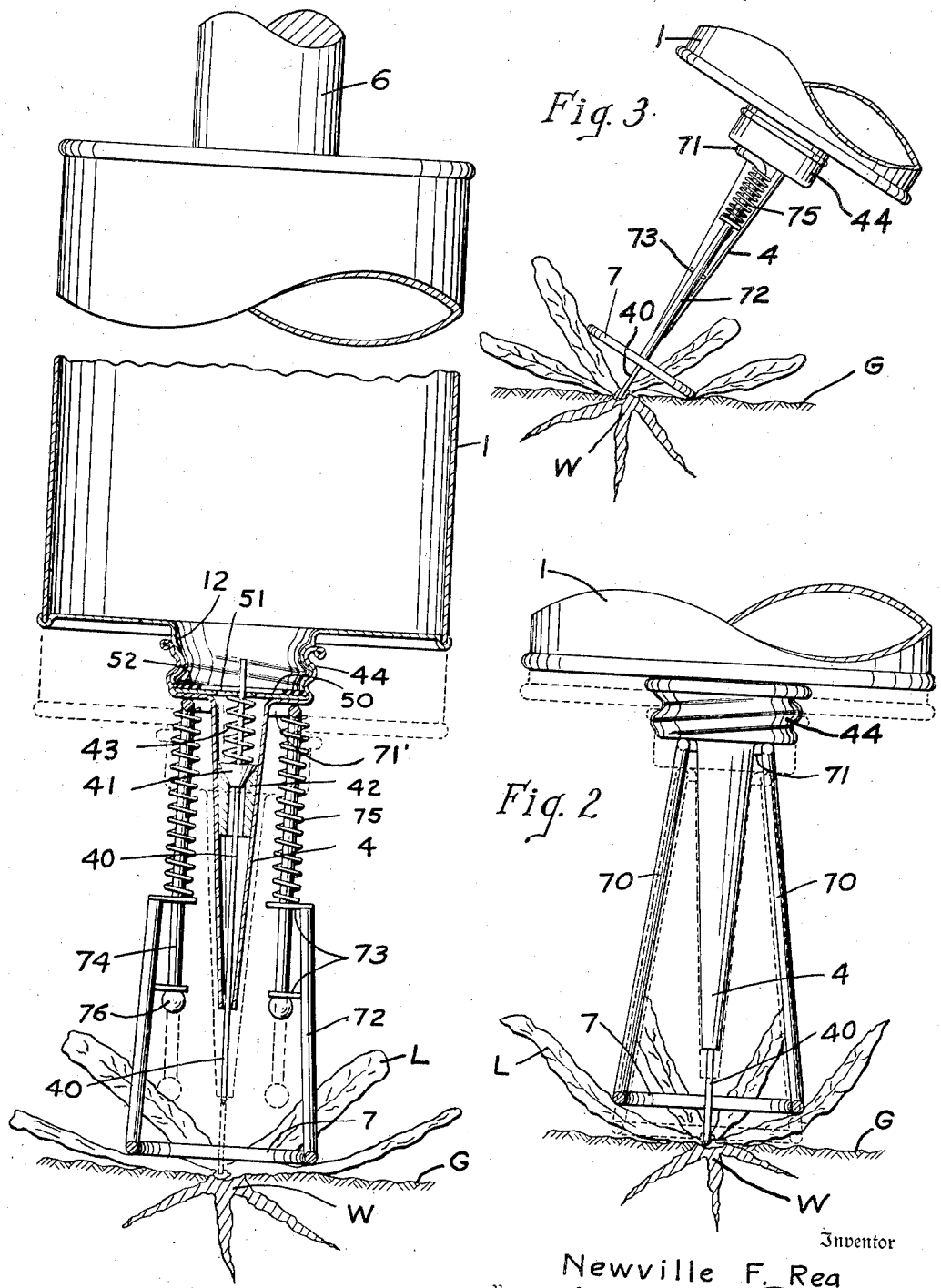
Inventor
Newville F. Rea
By Charles L. Reynolds
Attorney Patented Apr. 8, 1941

2,237,447

UNITED STATES PATENT OFFICE 2,237,447

WEED GUN

Newville F. Rea, Portland, Oreg.

Application December 4, 1939, Serial No. 307,457

12 Claims. (Cl. 47—49)

This invention relates to weed guns. While the principles thereof are applicable to various forms of weed gun, these principles are best illustrated by reference to the specific structure disclosed in the patent to C. L. Giezentanner, No. 1,960,738, with which the present invention is designed to function.

Such weed guns include a reservoir, containing usually a liquid which is destructive when discharged upon or when introduced within the fibrous structure of the root or base of a weed, a downwardly projecting spout for discharge of the liquid under the control of a discharge valve, and a downwardly projecting stem, usually extending through the spout and connected to the valve, so that upon pressure of the stem into or against the ground or a weed, the valve is opened and the liquid is discharged through the spout and is guided down the projecting portion of the stem into or upon the weed. Such weed guns are most conveniently operated by an operator who stands upright, carrying the weed gun at the end of a long stick or handle, so that the operator need not stoop nor work on his hands and knees. At the same time, because of the length of the supporting handle and the desirability of piercing the base of the weed with the small projecting end of the stem at the time of opening of the valve, and not before, the task is rendered somewhat awkward and difficult. It has been found, in practice, that a considerable amount of time is consumed in attempting to locate the point of the stem properly before plunging it in to open the valve. Frequently the valve stem is pressed, and liquid is discharged, before the stem has been located properly with relation to the weed. As an alternative the operator must discard the long handle and go about on hands and knees, so that he can the more easily and quickly position the stem relative to a weed which is to be pierced.

It is an object of the present invention to provide means in the nature of a guard, located adjacent the end of the spout and of the stem, which will contact the ground in advance of opening of the valve, and which will therefore permit the stem to be located, and assist in locating it, in such fashion relative to the weed that by further movement of the entire assembly the stem, thus readily and accurately located, may be plunged into the base of the weed to pierce the latter, and at the same time to accomplish discharge of liquid into the pierced base of the weed. The ultimate purpose of such an arrangement is to enable the more convenient and rapid operation of the weed gun, and a further object thereby attained is the conservation in the liquid itself, and economy in its use.

It is a further object to provide such guard means which will not interfere with the normal operation of the stem and valve, which may be made in several convenient, rugged, and inexpensive forms, and which may be applied either as part of the original weed gun or to guns already in use.

It is an object, also, to arrange the several parts in such relationship that, without interfering with the normal and intended functioning of the guard, spout, valve, and stem, the stem is protected against being plunged into the ground or a weed, to become plugged up thereby.

With these and other objects in mind, as will appear as this specification progresses, my invention comprises the novel parts, and the novel combination and arrangement thereof, in itself and with relation to the other parts of a weed gun, as shown in the accompanying drawing, described in this specification, and as will be more particularly defined by the claims which terminate the same.

In the accompanying drawing I have shown my invention in representative forms, and in preferred arrangements with the several parts of the weed gun, the latter in a preferred form.

Figure 1 is in part an elevation and in part a section through the weed gun, showing a guard in assembled and operative relationship thereto, and showing the whole in operative relationship to a weed.

Figure 2 is a view similar to Figure 1, showing a modified and simplified form of the guard.

Figure 3 is a detail in side elevation, showing the form of guard means illustrated in Figure 1, and illustrating the manner of use thereof prior to opening of the valve.

Such a weed gun includes a reservoir 1, which may take the form of a can with a threaded neck 12 at one end for the reception of a discharge spout 4, and provided at its other end with appropriate means (not shown) for the connection, permanently or temporarily, of a handle 6 of appropriate length, usually of sufficient length to permit it to be grasped by an operator who stands upright while the end of the stem, later described, is pressed into the ground or into a weed. Normally the discharge spout 4 is removably securable, as by the screw cap 44 fitting upon the threaded neck 12, and in operative position the spout 4 projects downwardly from the reservoir 1.

Within the spout a valve 41, carried upon a stem 40, seats upon a sleeve 42, which may be of rubber, and is normally held closed by a spring 43 reacting between the upper face of the valve and a perforated disk 50, through the perforations 51 of which the liquid passes from the reservoir into the spout. The disk is frictionally secured in place, with the assistance of a rubber ring or gasket 52, which grips the inside of the cap 44 to prevent accidental removal of the disk 50.

The stem 40 is guided within a central aperture of the disk 50, and at the lower discharge end of the spout 4, through which it projects. So long as the spring 43 holds the lower end of the stem 40 projected and the valve 41 seated, no liquid may discharge from the reservoir 1, but by relative upward or inward movement of the stem 40, caused by pressure of its projecting end into a weed W or into the ground G, the valve is opened, and liquid from the reservoir is permitted to discharge from the spout. This liquid, running down the stem as a guide, is discharged upon the weed or into the pierce in the weed caused by the sharpened end of the stem 40. However, as may readily be understood, the proper location of the projecting end of the stem, without such pressure upon it as will cause discharge of the liquid, is not an easy matter, and either time is consumed or liquid is wasted in attempting to do so by a person standing upright and operating the weed gun through the agency of the handle 6.

To prevent this, I provide a guard which, in the arrangement shown, takes the form of a ring 7 which encircles the lower end of the spout 4 and the stem 40. The ring must be at such a level that it is not appreciably above the lower end of the spout 4, and preferably is spaced somewhat below the lower end of the spout to prevent the spout being pressed so far down that dirt may enter its lower end. At the same time the guard ring 7 should be at such a level that the lower point of the stem 40 projects somewhat below it, in the normal position of parts or position of rest with the valve closed. The guard is supported in this position from the reservoir 1, although I prefer that it be supported from the cap 44, for in this manner the cap, spout, valve and guard can be assembled as a unit, and removed for shipment, the cap 44 being replaced by a closure cap, screwed in place.

The guard 7 may be rigidly spaced below the reservoir and the cap 44 by the rigid struts 70, shown in Figure 2, these terminating in a half-ring 71 which is secured by soldering or otherwise to the surface of the cap, or it may be yieldably supported for telescoping movement towards and from the reservoir, as in the form shown in Figures 1 and 3. In the latter form the ring 7 is directly supported by struts 72, provided with guide brackets 73 slidably embracing parallel rods 74, so that the struts 72 may slide lengthwise of the rods 74. The rods 74 are supported from the cap 44 by the ring 71', as before, and the ring 7 and its struts 72 are normally spaced distantly from the reservoir by the light springs 75, bearing between the ring 71' and a bracket 73. Downward movement of the ring 7 is limited, and its normal position is determined, by stops 76 on the end of the rods 74.

In either the rigidly supported form or the telescopingly supported form the guard contacts the ground, and may be dragged over the ground, with the weed gun disposed at an angle such that the projecting lower end of the stem 40 either is held clear of the ground, or at least is not pushed inward. Thus supported above the ground by the guard ring 7, the point of the stem 40 may be very accurately located in contact with or immediately above a weed. By straightening up the weed gun, and by pressing downward toward the ground level G and into the weed W, the point of the stem 40 is pressed into the weed, the valve is opened, and liquid from the reservoir runs down the stem and into the weed, pierced by the stem 40. At the same time the head of the weed, or the leaves thereof, as indicated at L, which may tend to obscure the point of the stem 40, are pressed outward and downward by the ring-like guard 7, as is indicated in Figures 1 and 2, and these leaves are held down and out of the way so that the operator may readily see what he is doing.

If the guard 7 is rigidly supported, as by the struts 70, the stem 40 may only be pressed inwardly to a limited extent, and the lower end of the spout 4 may not be pressed downwardly sufficient to enter the ground or the weed, and consequently it is unlikely that dirt can ever enter the lower end of the spout. In the form where the guard 7 is resiliently supported, it is preferably initially or normally in a position below the level of the lower end of the stem 40, and the ring, when pressed downwardly, first presses aside the leaves L, and before the end of the stem is pressed downwardly into contact with the weed the entire device may be shifted slightly, if necessary, to direct the point of the stem 40 at the heart of the weed. By further pressure downward the stem 40 is caused to enter the weed, and the valve is opened, as before. The stops 76 are located slightly below the level of the lower end of the spout, and if the weed gun is pressed downwardly far enough that there is danger of pressing the spout into the ground, the balls 76 strike the ground first, and prevent this.

What I claim as my invention is:

1. In a weed gun which includes a reservoir, a discharge spout, a valve controlling discharge from the reservoir through said spout, and a stem projecting downward and connected to the valve for opening thereof by movement of the stem caused by contact of the stem with the ground or the weed, guard means supported from the reservoir and engageable with the ground in advance of valve-opening contact by the stem, whereby to position the spout for discharge, the stem being thereafter movable, by shifting of the position of the reservoir, to discharge through the spout, as thus positioned.

2. In a weed gun which includes a reservoir, a discharge spout, a valve controlling discharge from the reservoir through said spout, and a stem operatively connected to the valve and movable by engagement with the ground or a weed to open the valve, guard means supported from the reservoir in position to engage the ground in advance of valve-opening movement of the stem, to prevent such movement prior to correct positioning of the spout for discharge.

3. In a weed gun which includes a reservoir, a discharge spout, and a valve controlling discharge from the reservoir through said spout, a guard supported from the reservoir, and disposed to contact the ground to assist in positioning the spout for discharge, and means, independent of the guard, thereafter operable for opening the valve.

4. In a weed gun which includes a reservoir, a discharge spout, a self-closing valve controlling discharge from the reservoir through said spout, and a stem projecting downwardly through the spout and operatively connected to open the valve by downward pressure on the reservoir after contact of the stem with the ground or a weed, a guard surrounding the spout and stem, and so positioned relatively to the stem and spout as to contact the ground prior to valve-opening movement of the stem, whereby to position the stem and spout prior to opening of the valve.

5. A weed gun of a length to be handled by a person standing, comprising in combination, a reservoir, a downwardly directed discharge spout, a self-closing valve controlling discharge from the reservoir through the spout, a stem projecting downwardly through and beyond the spout and operatively connected to open the valve by downward pressure on the reservoir after contact of the stem with the ground or a weed, and a guard supported from the reservoir, surrounding the spout and the stem, at a level between the lower end of the spout and the lower end of the stem, the guard being disposed so slightly above the lower end of the stem, with relation to its radial extent, that by a slight inclination of the weed gun the stem may be positioned to penetrate a weed while the weed gun is supported upon the guard, and prior to opening pressure upon the valve stem and valve.

6. In a weed gun, in combination, a reservoir, a discharge spout, a self-closing valve controlling discharge from the reservoir through the spout, and a stem projecting downwardly through the spout and operatively connected to open the valve by downward pressure on the reservoir after contact of the stem with the ground or a weed, a guard surrounding the spout and the stem, at a level below the end of the spout, and means telescopingly supporting the guard from the reservoir, to permit its relative movement upward coincidentally with relatively upward valve-opening movement of the stem.

7. In a weed gun, in combination, a reservoir, a discharge spout, a self-closing valve controlling discharge from the reservoir through the spout, and a stem projecting downwardly through the spout and operatively connected to open the valve by downward pressure on the reservoir after contact of the stem with the ground or a weed, a guard surrounding the spout and the stem, at a level below the end of the spout and the normal position of the stem's lower end, and means telescopingly supporting the guard from the reservoir, to permit its movement relatively upwardly for projection below it of the stem's lower end, to contact a weed, and for further conjoint relative upward movement of the guard and stem, to open the valve.

8. In a weed gun, in combination, a reservoir, a discharge spout, a self-closing valve controlling discharge from the reservoir through the spout, and a stem projecting downwardly through the spout and operatively connected to open the valve by downward pressure on the reservoir after contact of the stem with the ground or a weed, a guard surrounding the spout and the stem, at a level below the end of the spout and the normal position of the stem's lower end, means telescopingly supporting the guard from the reservoir, to permit its movement relatively upwardly for projection below it of the stem's lower end, to contact a weed, and for further conjoint relative upward movement of the guard and stem, to open the valve, and means supported from the reservoir, in position to engage the ground and to prevent sufficient downward movement of the spout as will permit contact of its lower end with the ground.

9. In a weed gun, in combination, a reservoir, a discharge spout, a self-closing valve controlling discharge from the reservoir through the spout, a stem projecting downwardly through and to a level below the lower end of the spout, and operatively connected to open the valve by downward pressure upon the reservoir after contact of the stem with a weed or with the ground, parallel guide rods supported rigidly from and terminating below the reservoir, in the vicinity of the lower end of the spout, a guard surrounding the spout, and normally disposed at a level below the lower end of the spout, guide means telescopingly supporting the guard from said guide rods, for movement of the guard relatively upwardly to a level in the vicinity of the lower end of the spout, and above the normal position of the lower end of the stem, and spring means to return the guard to its lower position when the downward pressure is relieved.

10. In a weed gun, in combination, a reservoir, a discharge spout, a self-closing valve controlling discharge from the reservoir through the spout, a stem projecting downwardly through and to a level below the lower end of the spout, and operatively connected to open the valve by downward pressure upon the reservoir after contact of the stem with a weed or with the ground, parallel guide rods supported rigidly from and terminating below the reservoir, in the vicinity of the lower end of the spout, a guard surrounding the spout, and normally disposed at a level below the lower end of the spout, guide means telescopingly supporting the guard from said guide rods, for movement of the guard relatively upwardly to a level in the vicinity of the lower end of the spout, and above the normal position of the lower end of the stem, balls upon the lower ends of the parallel guide rods, for contact with the ground, thereby to limit downward movement of the spout and to prevent entrance into the ground of its lower end, and spring means to return the guard to its lower position when the downward pressure is relieved.

11. A weed gun comprising, in combination, a reservoir, a discharge spout, a valve controlling discharge from the reservoir through said spout, a guard supported from and immovable, during operation, relative to the reservoir, said guard being so disposed, relative to the stem, as to contact the ground to assist in positioning the spout for discharge, and means thereafter operable for opening the valve.

12. A weed gun comprising, in combination, a reservoir, a discharge spout, a valve controlling discharge from the reservoir through said spout, a guard supported from the reservoir, and disposed to contact the ground in advance of valve-opening movement to assist in positioning the spout for discharge, and means thereafter operable for opening the valve.

NEWVILLE F. REA.